United States Patent
Yang

(10) Patent No.: US 11,246,419 B2
(45) Date of Patent: Feb. 15, 2022

(54) SCREWLESS CHAIR

(71) Applicant: Tao Yang, Ontario, CA (US)

(72) Inventor: Tao Yang, Ontario, CA (US)

(73) Assignee: Festival Trading Inc., Ontario, CA (US)

( * ) Notice: Subject to any disclaimer, the term of this patent is extended or adjusted under 35 U.S.C. 154(b) by 0 days.

(21) Appl. No.: 16/932,797

(22) Filed: Jul. 19, 2020

(65) Prior Publication Data

US 2022/0015544 A1    Jan. 20, 2022

(51) Int. Cl.
*A47C 4/02* (2006.01)
*A47C 7/54* (2006.01)
*A47C 4/04* (2006.01)
*F16B 12/10* (2006.01)

(52) U.S. Cl.
CPC ............ *A47C 4/021* (2013.01); *A47C 4/04* (2013.01); *A47C 7/546* (2013.01); *F16B 12/10* (2013.01); *F16B 2012/103* (2013.01)

(58) Field of Classification Search
CPC .......... A47C 4/02; A47C 4/021; A47C 4/028; A47C 4/03; A47C 4/04; A47C 4/08; A47C 4/18; A47C 4/42; A47C 7/48; A47C 7/546; A47C 13/005; A47C 1/024
USPC ... 297/378.1, 440.1, 440.15, 440.16, 440.23, 297/440.24
See application file for complete search history.

(56) References Cited

U.S. PATENT DOCUMENTS

| | | | | |
|---|---|---|---|---|
| 210,500 A | * | 12/1878 | Clough | A47C 1/03255 297/342 |
| 277,454 A | * | 5/1883 | Bruschke | A47C 4/02 297/440.23 |
| 616,346 A | * | 12/1898 | O'Keefe | A47C 4/02 297/440.23 |
| 1,278,491 A | * | 9/1918 | Metzger | A47C 4/02 297/440.23 |
| 2,132,309 A | * | 10/1938 | McKinley | A47C 4/10 297/36 |
| 2,163,078 A | * | 6/1939 | Zerbee | A47C 3/021 248/628 |

(Continued)

FOREIGN PATENT DOCUMENTS

| | | | | |
|---|---|---|---|---|
| CH | 165463 A | * | 11/1933 | A47C 4/02 |
| CH | 187388 A | * | 11/1936 | A47C 4/028 |

(Continued)

OTHER PUBLICATIONS 2 page PDF of machine translation of CH 165463A. (Year: 1933).*

(Continued)

*Primary Examiner* — Robert Canfield
(74) *Attorney, Agent, or Firm* — Jen-Feng Lee, Esq.

(57) ABSTRACT

Present invention teaches a screwless chair where the unassembled product can come in a flat package, reducing the size of storage and adding to the ease of transportation. No screws are needed for the chair of present invention; no tools are needed for the assembly/disassembly when a user unfolds the seat back from the seat base, slides the hook pieces along the groove pieces and set the seat back down by setting the insertion pegs to the corresponding insertion holes. Errors in setting up the chair can be avoided. The ease of setting up, and thus the sturdiness and the safety of the chair, is not affected by repeated disassembly/re-assembly.

2 Claims, 4 Drawing Sheets

(56) References Cited

U.S. PATENT DOCUMENTS

| | | | | | |
|---|---|---|---|---|---|
| 2,333,073 | A | * | 10/1943 | Mueller | A47C 4/02 297/440.23 |
| 2,650,656 | A | * | 9/1953 | Ohlsson | A47C 4/028 297/440.23 |
| 2,650,657 | A | * | 9/1953 | Ohlsson | A47C 4/02 297/440.23 |
| 3,301,597 | A | * | 1/1967 | Bereday | A47C 4/02 297/450.1 |
| 3,663,059 | A | * | 5/1972 | Omlie | A47C 4/022 297/440.2 |
| 4,124,251 | A | * | 11/1978 | Petersen | A47C 4/02 297/411.42 |
| 4,324,433 | A | * | 4/1982 | Saiger | A47C 4/02 108/155 |
| 4,919,485 | A | * | 4/1990 | Guichon | A47C 4/03 297/440.23 |
| 6,241,317 | B1 | * | 6/2001 | Wu | A47C 4/02 297/440.1 |
| 6,422,654 | B1 | * | 7/2002 | Grove | A47C 7/42 297/440.1 |
| 7,188,908 | B2 | * | 3/2007 | White | A47C 4/02 297/440.14 |
| 7,252,339 | B2 | * | 8/2007 | Owens | A47C 4/02 297/440.1 |
| 2007/0108823 | A1 | * | 5/2007 | Grabowski | A47C 13/005 297/354.1 |
| 2011/0215630 | A1 | * | 9/2011 | Grove | A47C 7/42 297/440.1 |
| 2016/0249742 | A1 | * | 9/2016 | Xie | A47C 4/028 297/440.23 |

FOREIGN PATENT DOCUMENTS

| | | | | | |
|---|---|---|---|---|---|
| CH | | 278236 | A | * 10/1951 | A47C 4/02 |
| FR | | 1506562 | A | * 12/1967 | A47C 4/04 |
| FR | | 2421581 | A1 | * 11/1979 | A47C 4/02 |
| GB | | 825376 | A | * 12/1959 | A47C 4/02 |
| GB | | 846470 | A | * 8/1960 | A47C 4/03 |

OTHER PUBLICATIONS 2 page PDF of machine translation of CH 187388A. (Year: 1936).*
5 page PDF of machine translation of CH 278236A. (Year: 1951).*
2 page PDF of machine translation of FR 1506562A. (Year: 1967).*

* cited by examiner

SCREWLESS CHAIR

FIELD AND BACKGROUND OF THE INVENTION

Chairs are necessary furniture products for offices and homes. The common shape of a chair takes up a substantial amount of volume when it is being stored or transported, if the chair is not designed in a stackable fashion.

In the last 30 years or so, it has been a popular trend that furniture products, including chairs, come in a pre-assembled package, reducing the size for storage and transportation. Many such pre-assembled chairs are widely available in various big-box stores.

The downside of such pre-assemble chairs is that it takes some effort on the part of consumers to locate the right parts, find the right tools (screw drives, for example), and fit all the components together. As can be imagined, errors are oftentimes made by consumers when installing/setting up chairs from parts that are contained in a box, or boxes.

If there is a need to disassemble the chairs, a reverse process has to be done, and re-assemble at a new/changed location. Not only is the assembly process prone to errors, the quality of the chairs will deteriorate as the process of assembly and disassembling is repeatedly. The sturdiness, and thus the safety, of the popular pre-assembled chairs becomes more of a concern, consequently.

Present invention provides a screwless chair that is simple to assemble and can come in a small package that's cost-effective even for storage and transportation, while the sturdiness of the chair will endure multiple assemble-disassemble runs, greatly adding to the safe usage for consumers.

SUMMARY OF THE INVENTION

The invention relates to a screwless chair that can come in a compact package during storage and transportation. For consumers to set up and install into a chair ready for use in an office or in a house environment, it takes little effort because the set up process uses no screws of any kind, and requires no tools of any kind.

The screwless chair of present invention is primarily composed of a seat back, a seat base, and two armrest pieces. The two armrest pieces stand on the two sides in a vertical fashion to support the weight of the whole chair, including the person that will sit on the chair. The armrest pieces can be made substantially in a rectangular shape.

The seat base is pivotably connected to the seat back. The connection can be made by using two metal rivets on the two lower ends of the seat back, so that the seat base and seat back form a foldable unit.

The seat back is attached to the two armrest pieces by a hook piece, on each side, that can be slidably connected to a groove piece on each of two armrest pieces.

The seat base has 4 insertion pegs that insert into corresponding insertion holes on the two armrest pieces.

As will be further explained below, the assembly and disassembly of the chair in present invention does not involve any screw, or any screw drivers or tools. The installation process is simple and safe. Even repeated assembly and disassembly of the chair of present invention will not cause any loss of parts or mistakes in the process.

A user merely needs to unfold the seat back from the seat base, line up the hook pieces on the two sides of the seat back, slide the hook pieces into the corresponding groove pieces on the armrest pieces. At the same time, align the insertion pegs to the corresponding insertion holes on the two armrest pieces, the assembly process is complete safely and quickly.

DESCRIPTION OF THE DRAWINGS

The accompanying drawings exemplify the preferred embodiments of the invention. Together with the description, serve to explain the principles of the invention.

A brief description of the drawings is as follows.

DETAILED DESCRIPTION OF THE PREFERRED EMBODIMENT

The screwless chair of present invention is primarily composed of a seat back 3, a seat base 2, and two armrest pieces 1.

The seat base 2 is pivotably connected to the seat back 3. A preferred embodiment of the pivotable connection between the seat base 2 and the seat back 3 is by two metal rivets 4 on the two lower ends of the seat back 3, so that the seat base 2 and seat back 3 form a foldable unit. As such, during storage and transportation, the seat base 2 and the seat back 3 take up a small space similar to a flat table top.

Figure 4:
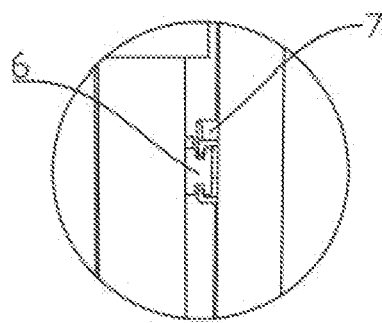
FIG. 4 is the exploded view of circle A in FIG. 3.

Each of the two armrest pieces 1 has a groove piece 6 that can be slidably connected to a hook piece 7 on the seat back 3. This is shown in FIG. 4.

Figure 5:
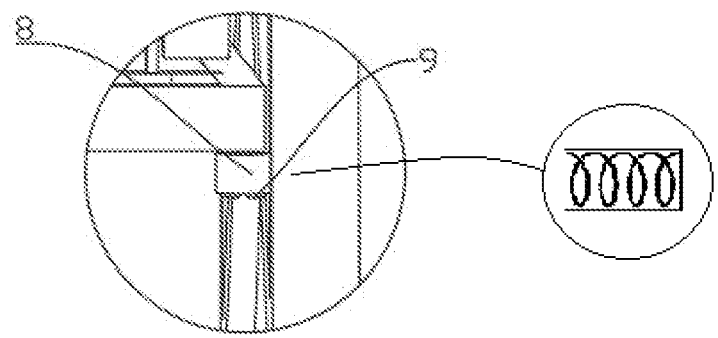
FIG. 5 is the exploded view of circle B in FIG. 3.

Four insertion pegs 9 are located on an underside of the seat base 2 for insertably connecting to four insertion holes 8 located on the two armrest pieces 1. FIG. 5 shows one insertion peg 9 and one insertion hole 8.

Each of the hook pieces 7 additionally has an end plate to limit the sliding travel of the hook pieces 7 relative to the groove pieces 6, so that the angle of the seat back 3 can be fixed as set by the end plate.

The end plate's location on the hook piece 7 allows some adjustment, which allows the length of sliding travel of the hook pieces 7 relative to the groove pieces 6, so as to provide a range of angle adjustment of the seat back 3.

Additionally, each of the insertion hole 8 has a push-spring that can lock the insertion peg 9 in place. The push-spring used herein is simply a spring located inside each of the insertion hole 8 where it gets pushed back, compressed, when the insertion peg 9 is inserted in and helps to lock the insertion peg in place.

Figure 1:
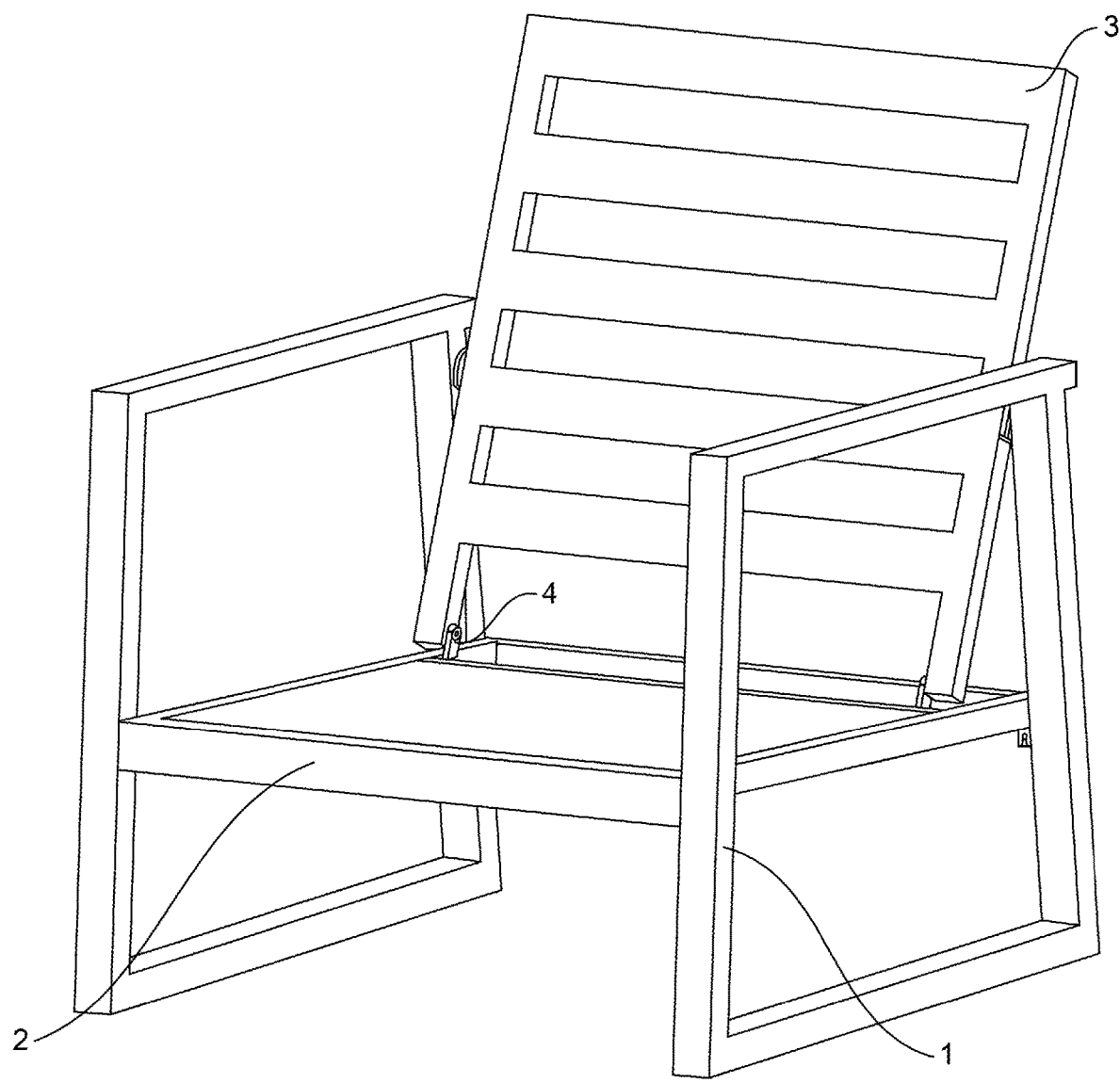
FIG. 1 is the perspective view of the primary structures of present invention.
Figure 2:
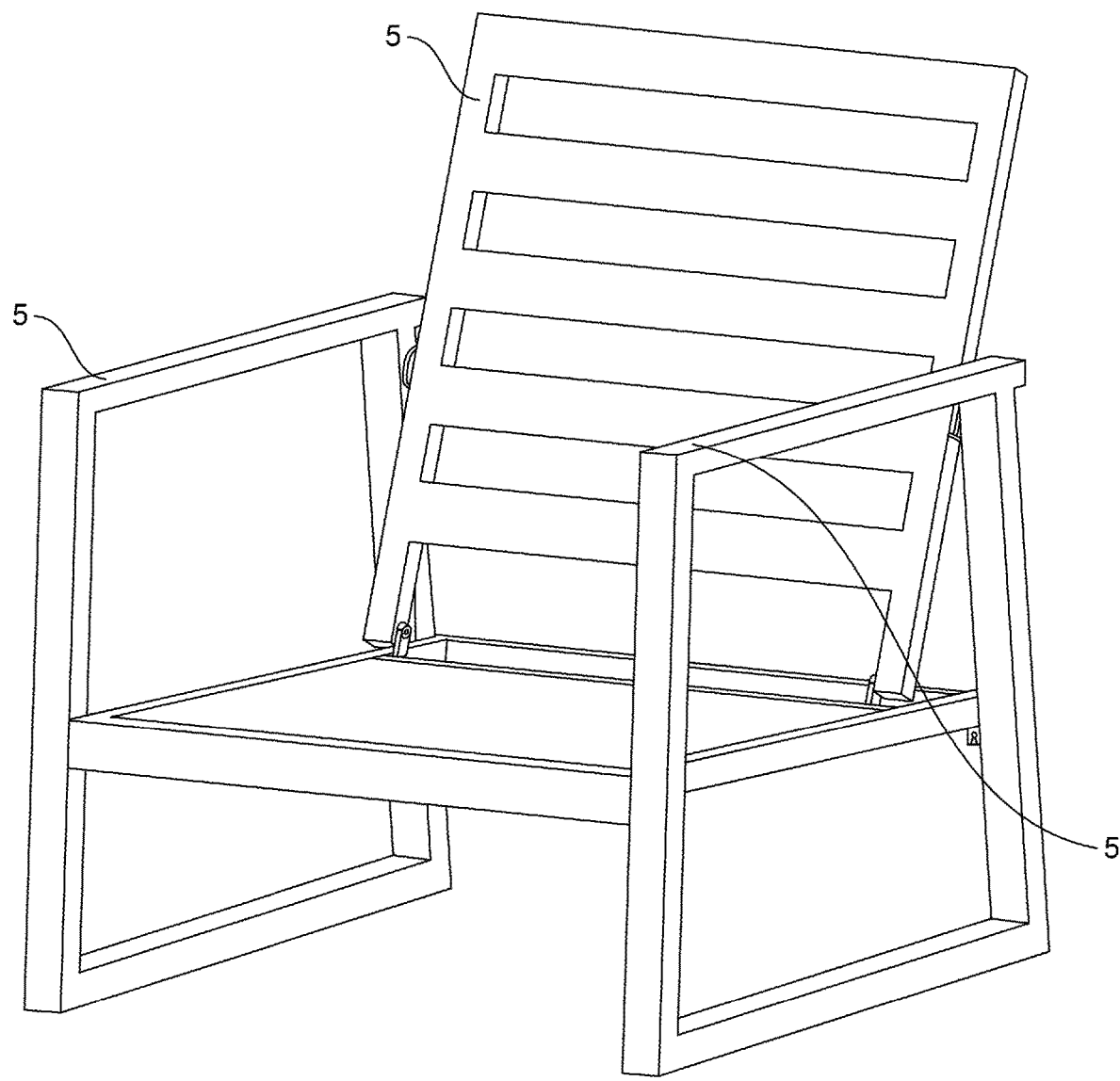
FIG. 2 shows the part of the chair that can be made by reinforced square tube.
Figure 3:
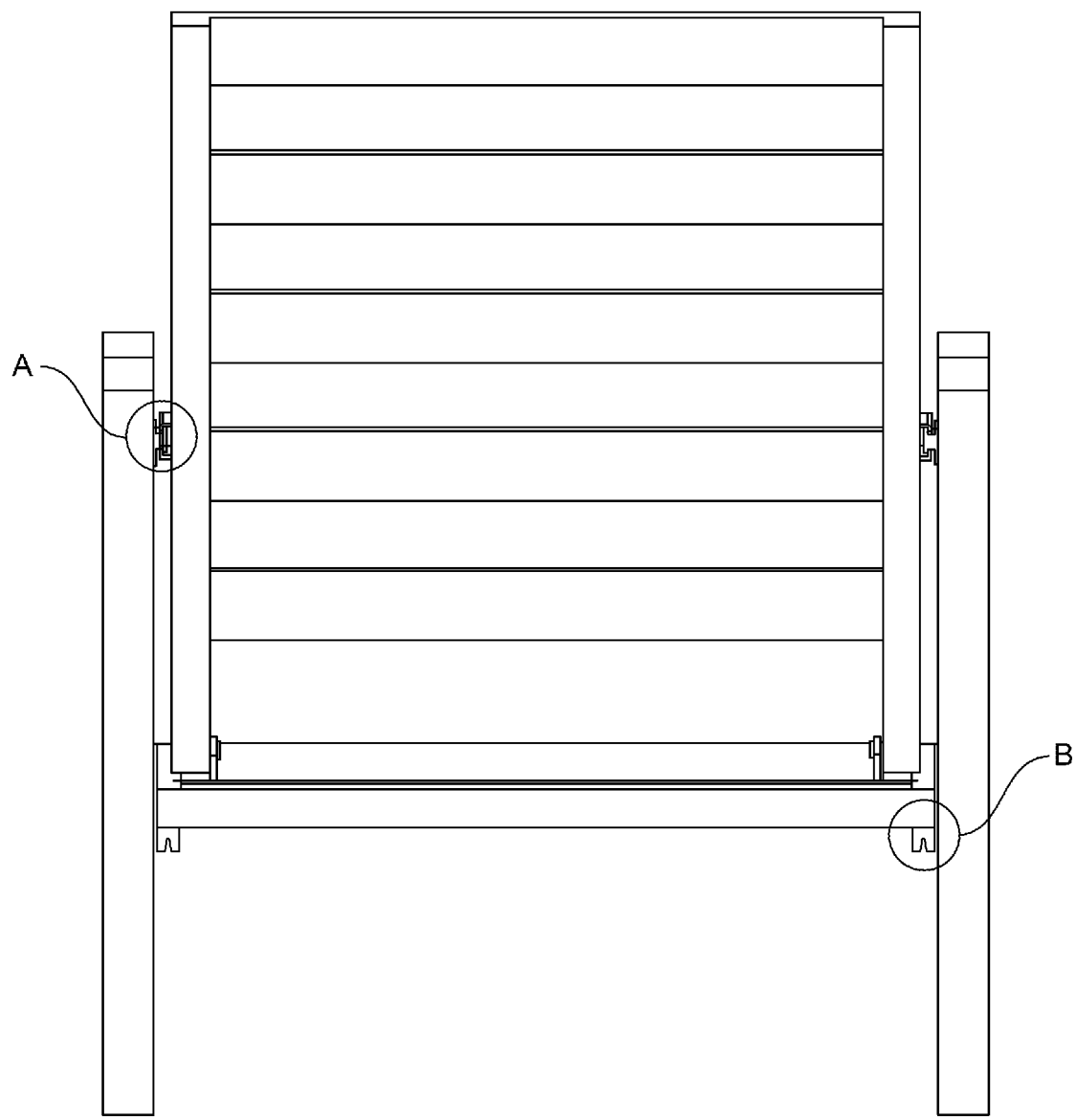
FIG. 3 is the frontal view of the chair, with two circled parts, denoted as A and B, shown by the exploded views in FIGS. 4 and 5.

The armrest pieces 1 can be made substantially in the shape of a rectangle, as shown in FIGS. 1 and 2. To provide better supporting strength, the armrest pieces 1 are made of reinforced squared tube 5. The seat back 3 can also be made from the same reinforced square tube 5.

To assemble the product into a usable form, no screws are needed. A user merely needs to unfold the seat back 3 from the seat base 2, line up the hook pieces 7 on the two sides of the seat back 3 for sliding into the corresponding groove pieces 6 on the armrest pieces 3, which are held to stand up in a vertical fashion.

Meanwhile, align the insertion pegs 9, which are at the four corners on the underside of the seat base 2, and insert the pegs 9 into the corresponding insertion holes 8 on the two armrest pieces 1; each armrest pieces 1 has two insertion holes 8.

It is estimated that the time it takes to finish the assembly of the present invention's screwless chair can be done in a minute or two.

The foregoing disclosure of preferred embodiments for this invention has been presented for purposes of illustrating the substance of the invention. It is not intended to be exhaustive or to limit the invention to the precise form disclosed. Variations and additional embodiments are possible in light of the above teachings, and thereby enable one of ordinary skill in the art to fully utilize the invention.

All such modifications and variations are within the scope of the invention as determined by the appended claims when interpreted in accordance with the breadth to which they are fairly, legally, and equitably entitled.

The invention claimed is:

1. A screwless chair, comprising:
   a seat back;
   a seat base pivotably connected to the seat back by two metal rivets on two lower ends of the seat back; and
   two armrest pieces wherein
   a groove piece on each of the armrest pieces is slidably connected to a hook piece on two sides of the seat back, the hook pieces further having an end plate to limit the sliding travel of the hook pieces to the groove pieces, and
   four insertion pegs are located on an underside of the seat base for connecting to four insertion holes made on the two armrest pieces.

2. A screwless chair, comprising:
   a seat back;
   a seat base pivotably connected to the seat back by two metal rivets on two lower ends of the seat back; and
   two armrest pieces wherein
   a groove piece on each of the armrest pieces is slidably connected to a hook piece on two sides of the seat back, and
   four insertion pegs are located on an underside of the seat base for connecting to four insertion holes made on the two armrest pieces, and wherein each of the insertion holes has a push-spring to lock the insertion pegs in place.

\* \* \* \* \*